US006819554B2

(12) United States Patent
Juneau

(10) Patent No.: US 6,819,554 B2
(45) Date of Patent: Nov. 16, 2004

(54) UNIVERSAL AUTO THEATER SYSTEM FOR NOTEBOOK PC

(75) Inventor: James J. Juneau, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 93 days.

(21) Appl. No.: 10/294,298

(22) Filed: Nov. 13, 2002

(65) Prior Publication Data

US 2004/0090739 A1 May 13, 2004

(51) Int. Cl.$^7$ ................................................. G06F 1/16
(52) U.S. Cl. .................... 361/683; 361/686; 296/24.34; 224/275
(58) Field of Search ................................ 361/680–686, 361/683, 724–727, 679; 224/576, 577, 153, 578, 579, 580, 581–585, 586, 628, 630, 275, 920, 929; 206/576, 305, 449, 320; 190/100, 107, 109–112; 273/148 B; 297/188.04, 188.05, 188.06–188.08, 188.21; 296/37.6, 37.15, 37.16; 135/911

(56) References Cited

U.S. PATENT DOCUMENTS

| | | | | | |
|---|---|---|---|---|---|
| 5,397,160 | A | * | 3/1995 | Landry | 296/37.8 |
| 5,555,491 | A | * | 9/1996 | Tao | 361/686 |
| 5,667,272 | A | * | 9/1997 | Sutton | 297/140 |
| 5,881,934 | A | * | 3/1999 | Hung | 224/275 |
| 5,984,347 | A | * | 11/1999 | Blanc-Rosset | 280/727 |
| 6,092,705 | A | * | 7/2000 | Meritt | 224/275 |
| 6,109,188 | A | * | 8/2000 | Russell | 108/44 |
| 6,135,546 | A | * | 10/2000 | Demtchouk | 297/135 |
| 6,216,927 | B1 | * | 4/2001 | Meritt | 224/275 |
| 6,273,310 | B1 | * | 8/2001 | Gregory | 224/275 |
| 6,279,977 | B1 | * | 8/2001 | Chen | 296/24.34 |
| 6,315,252 | B1 | | 11/2001 | Schultz | |
| 6,426,869 | B1 | * | 7/2002 | White | 361/683 |
| 6,659,319 | B2 | * | 12/2003 | Purpura | 224/576 |
| 6,685,016 | B2 | * | 2/2004 | Swaim et al. | 206/320 |

FOREIGN PATENT DOCUMENTS

| | | | | |
|---|---|---|---|---|
| DE | 003904107 A1 | * | 2/1989 | A44B/11/14 |
| JP | 02001151028 A | * | 6/2001 | B06R/11/02 |
| WO | WO 96/32783 | * | 10/1996 | H04B/1/38 |

OTHER PUBLICATIONS

Ric Manning, New car stereos put home theater on wheels, The Gizmo Page, Mar. 25, 2000, http://www.courier-journal.com/gizweb/cols/00/0003d.htm.
Steel Horse VT56M Video & TV Traveler, Crutchfield.com, Jul. 2, 2002, http://www.crutchfield.com/cgi-bin/S-e0CnMcrdVcY/ProdView.asp?a=0&s=0&g=39700&i. . .
Car Video Frequently Asked Questions; Crutchfield.com Jul. 2, 2002, http://www.crutchfield.com/S-MNsXDIrhxU1/infocenter/car/video_faq.html.
Play your favourite video games or watch your DVD Movies in your car in minutes, Jul. 2, 2002, http://www.habitek.co.uk/GameGo%20Info.htm.

(List continued on next page.)

Primary Examiner—Michael Datskovsky

(57) ABSTRACT

The present invention can be embodied as a case for securing a notebook computer with video display to a vehicle center hump in a position for viewing. The case comprises a containing enclosure having a top part, a bottom part, and a surrounding sidewall configured to contain the notebook computer. A plurality of straps are coupled at one end to opposing side locations of the case, and include an anchoring member at an opposing end of each of the plurality of straps for anchoring the case in a stable position at the center hump, such that the notebook computer may be removably secured within the case in a position for viewing the video display.

4 Claims, 2 Drawing Sheets

OTHER PUBLICATIONS

State of the Art in Mobile Computing, The New Mobile AirDesk Laptop Stand for Cars and Trucks, The AirDesk Showroom, Jul. 2, 2002, http://www.airdesks.com/CarDesk.asp.

Eric C. Evarts, Cars as rolling offices, with a laptop on dash, The Christian Science Monitor, Jan. 9, 2001, http://www.csmonitor.com/durable/2001/01/09/pls2.htm.

Vehicle Mounts Featuring LapTraveler Mobile Desks, Interactive Products Corporation, Jul. 2, 2002, http://www.laptraveler.com/automounts.htm.

How to Choose a Car Video System, Crutchfield.com, Jul. 2, 2002, http://www.crutchfield.com/S-eOCnMcrdVcY/infocenter/car/video.html.

* cited by examiner

UNIVERSAL AUTO THEATER SYSTEM FOR NOTEBOOK PC

BACKGROUND OF THE INVENTION

Media equipment designed to play movies from DVDs, VCDs, VCR tapes etc., is becoming more compact as technology advances. This decrease in size has increased the portability of movie players, leading to their integration into vehicles. On long trips, children can grow very restless, to the point of causing serious distractions to the driver. Similarly, lengthy rides can be uncomfortable to adult passengers. In these situations, having the ability to play movies in the vehicle is a great stress reliever for the driver, as well as allowing the adult passengers to make a long and tiring journey pass more swiftly. When children are intently involved in watching a movie they are less likely to distract the driver, making the trip not only more enjoyable, but safer too. But previous introductions of movie players into vehicles suffer from numerous drawbacks and limitations.

One system of bringing movies into a vehicle utilizes a full size VCR and a small TV monitor. An example of this is the Steel Horse VT56M, Video & TV Traveler system. In this case, a TV monitor with a built in speaker and a VCR are secured into a zip-up ease that straps between the headrests of the two front seats for rear seat viewing. This system is not suitable for playing DVDs, however, because of the vertical position of the player. Also, due to the fact that the zip-up case is mounted on the back of the front seat, passengers in the front of the automobile are precluded from using the system.

Another system to play movies in a vehicle consists of an LCD monitor with built in speakers that hangs on the back of the driver or passenger headrest. An example of this is the GameGo In Car Video System. Input to the LCD screen is from a DVD, VCR, or a game system capable of playing DVDs, such as the Sony Playstation 2, Microsoft's Xbox, or Nintendo's Game Cube. Hanging the LCD monitor from the headrest of one of the front seats, however, causes viewing problems. The monitor may be too close to the user, and its placement on one side of the car makes it difficult for all back seat passengers to view it. Similarly, it cannot be viewed by front seat passengers. More significantly, the movie player is not attached to the monitor, leaving it lying somewhere on the back seat or on the floor. This creates a risk of damage to the player, and a risk of injury during auto accidents.

A recent trend in car video systems utilizes an in-dash DVD player with a retractable LCD monitor. Examples of this are Pioneer's Visual Audio system and Sony's in-dash XAV-7W audio/video receiver. The fact that these systems have small 7" to 8" screens, make them useful only to front seat passengers. They also require significant installation, precluding portability from one automobile to another. In-dash stereo placement is also such that the LCD monitor may be positioned up closer to the driver's field of view, adding a significant distraction and thus increasing the chance of an accident.

SUMMARY OF THE INVENTION

The present invention can be embodied as a case for securing a notebook computer with video display to a vehicle center hump in a position for viewing. The case comprises a containing enclosure having a top part, a bottom part, and a surrounding sidewall configured to contain the notebook computer. A plurality of straps are coupled at one end to opposing side locations of the case, and include an anchoring member at an opposing end of each of the plurality of straps for anchoring the case in a stable position at the center hump, such that the notebook computer may be removably secured within the case in a position for viewing the video display.

The present invention can also be embodied as a video system for playing video in a vehicle. The video system includes a notebook computer with a video display, floor covering disposed over a center hump within the vehicle, a case for securing the notebook computer to the center hump in a position for viewing, a power adapter configured such that the notebook computer can receive power from a vehicle DC outlet, and an audio adapter to transmit an audio signal from the notebook computer to a vehicle audio system.

The present invention can also be embodied as a method for viewing video in a vehicle. In the first step of the method, a notebook computer is anchored to a vehicle center hump in a position for viewing. In the second step, the notebook computer is coupled to the vehicle's DC power supply. In the third step, the notebook computer's audio output is coupled to the vehicle's audio system. In the fourth step, video is played on the notebook computer such that the video can be viewed on the notebook computer's video screen and audio output from the video is played over the vehicle's audio system.

Additional features and advantages of the invention will be apparent from the detailed description which follows, taken in conjunction with the accompanying drawings, which together illustrate, by way of example, features of the invention.

DETAILED DESCRIPTION

Figure 1:
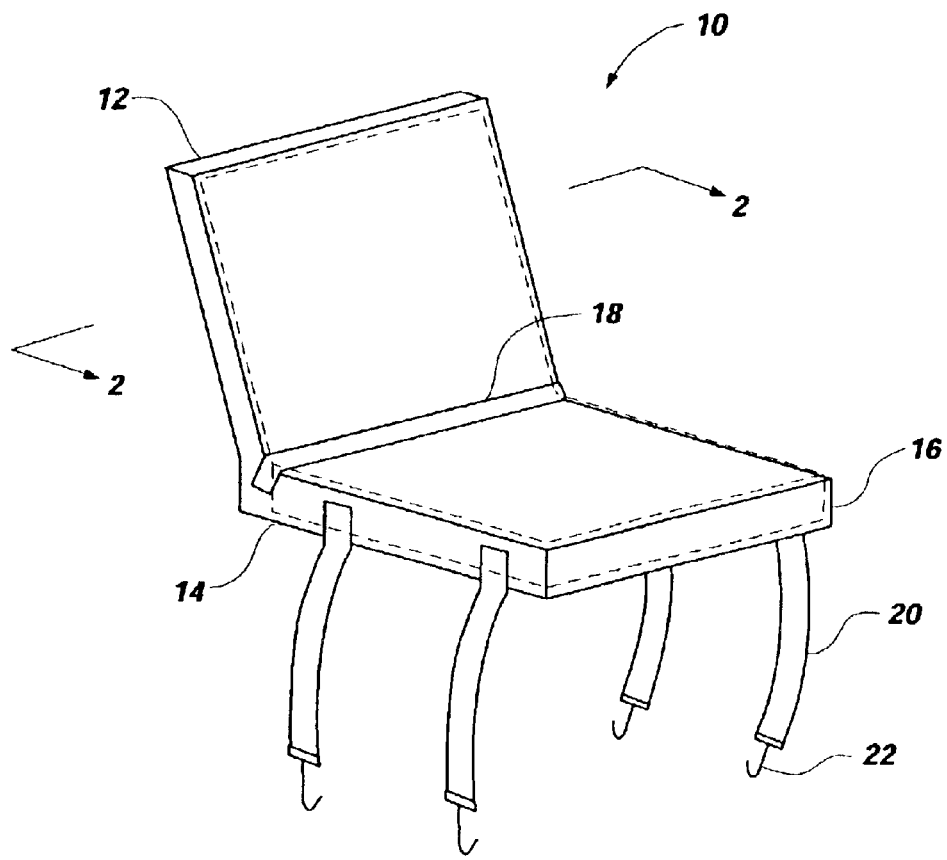
FIG. 1 is a perspective view of a case in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Figure 2:
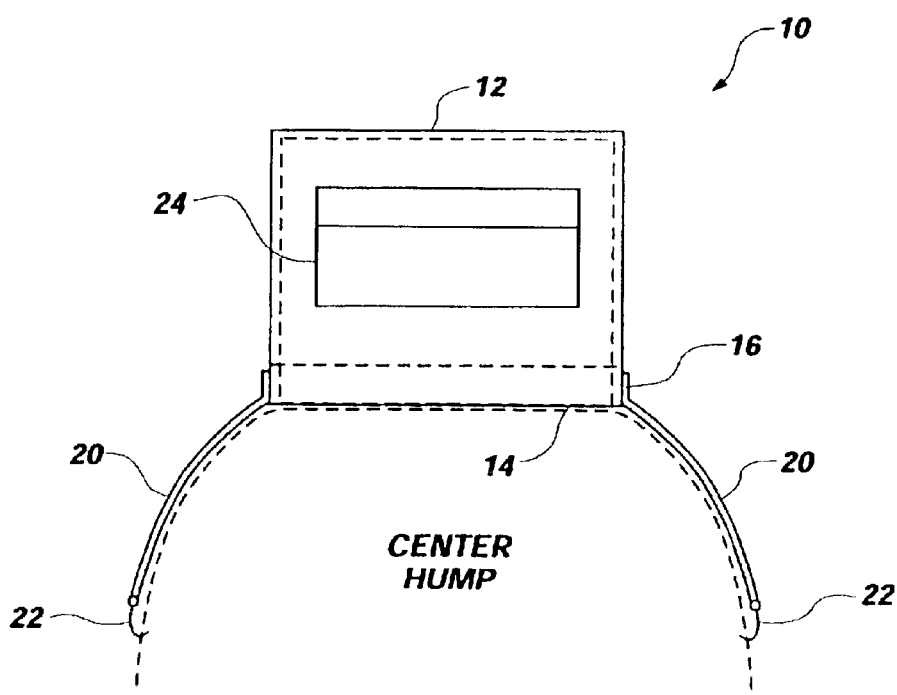
FIG. 2 is a perspective view of the case of FIG. 1.

An embodiment of the present invention may be described as a case for securing a notebook computer with video display to a vehicle center hump in a position for viewing. This allows positioning of the notebook computer for optimal viewing by passengers in the front and back seats of the vehicle. As shown in FIGS. 1 & 2,s the case 10 comprises a containing enclosure having a top part 12, a bottom part 14, and a surrounding sidewall 16. The notebook computer rests on the bottom part 14, and is surrounded by the surrounding sidewall 16. The top part 12 is attached to the back side of the notebook computer's LCD screen, providing protection from the sun. A securing strap 18 is used to removably secure the notebook computer into the case 10. The case 10 can be hard or soft, made from materials such as nylon, rubber, fabric, metal, plastic or any other material known to be useful to one skilled in the art.

The case also comprises a plurality of straps 20 coupled at one end to opposing side locations of the case 10. At the opposing end of each of the plurality of straps 20 is an anchoring member 22 for securing the case in a stable position at the center hump. The anchoring members 22 may be hooks, snaps, pins, clamps, elastomeric bands, hook and loop devices, or any other anchoring device known to one skilled in the art. The plurality of straps 20 may be constructed to be detachable from the case 20 to facilitate portability and storage. The case 10 may also comprise a pocket 24 to contain the detached plurality of straps 20.

Figure 3:
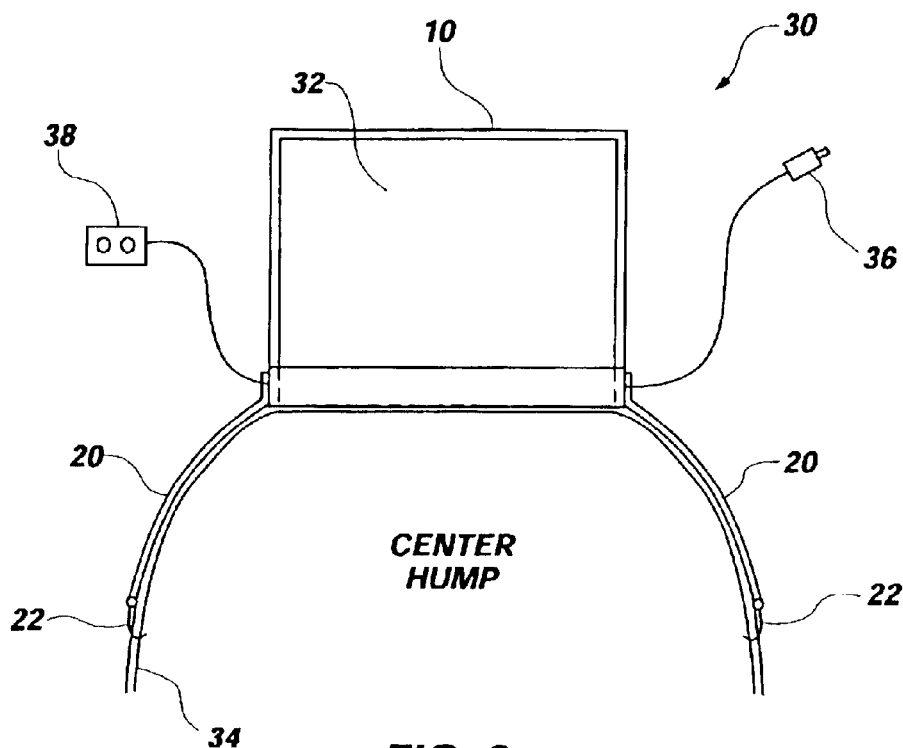
FIG. 3 is perspective view of a video system in accordance with an embodiment of the present invention.

The present invention may also be embodied as a video system for playing video in a vehicle. As shown in FIG. 3, the video system 30 comprises a notebook computer 32, a case 10 for securing the notebook computer 32 to a vehicle center hump, floor covering 34 disposed over the center hump, a power adapter 36, and an audio adapter 38.

The notebook computer 32 is placed within the case 10 and secured to the floor covering 34 by the anchoring means 22 described above. The notebook computer 32 is used to play the video from an internal DVD player or other video means. A power adapter 36 is coupled at one end to an AC connector on the notebook computer 32, and at the other end to a DC power source in the vehicle, such as a DC powered cigarette lighter. The power adapter 36 allows the notebook computer 32 to be utilized using the vehicles internal power source, without having to rely on the notebook computer's internal batteries. An audio adapter 38 is used to couple the notebook computer's 32 audio output to the vehicles audio system. This allows any audio accompanying the video to be played over the vehicles audio system. Depending on the vehicle's audio system, this can be done using a direct cable connection to an audio input or via the vehicle's audio cassette player using an audio cassette adapter.

Figure 4:
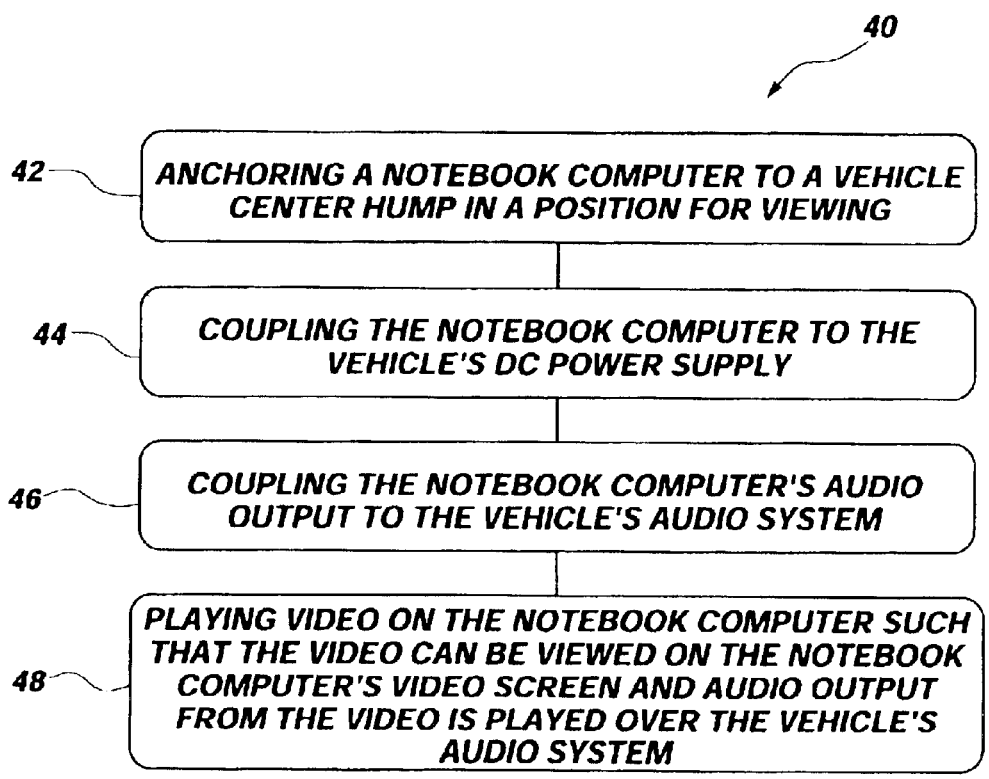
FIG. 4 is a diagram representing the steps of a method for viewing video in a vehicle.

As shown in FIG. 4, the present invention may also be embodied as a method 40 for viewing video in a vehicle. In the first step 42 of the method, a notebook computer is anchored to a vehicle center hump in a position for viewing. In the second step 44, the notebook computer is coupled to the vehicle's DC power supply. In the third 46 step, the notebook computer's audio output is coupled to the vehicle's audio system. In the fourth step 48, video is played on the notebook computer such that the video can be viewed on the notebook computer's video screen and audio output from the video is played over the vehicle's audio system.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth in the claims.

What is claimed is:

1. A case for securing a notebook computer with video display to a vehicle center hump in a position for viewing, comprising:
   a) a containing enclosure having a top part, a bottom part, and a surrounding sidewall configured to contain the notebook computer;
   b) a plurality of straps coupled at one end to opposing side locations of the case and including an anchoring member at an opposing end of each of the plurality of straps for anchoring the case in a stable position at the center bump; and
   c) a compartment wherein the notebook computer may be removably secured within the case in a position for viewing the video display;
   wherein the plurality of straps are detachable from the case; and
   wherein a pocket is disposed in the case to contain the detached plurality of straps.

2. A video system for playing video in a vehicle, comprising:
   a) a notebook computer with a video display;
   b) floor covering disposed over a center hump within the vehicle;
   c) a case for securing the notebook computer to the center hump in a position for viewing, further comprising;
      1) a containing enclosure having a top part, a bottom part, and a surrounding sidewall configured to contain the notebook computer;
      2) a plurality of straps coupled at one end to opposing side locations of the case, and including an anchoring member at an opposing end of each of the plurality of straps for anchoring the case in a stable position at the center hump by attaching to the floor covering; and
      3) a compartment wherein the notebook computer may be removably secured within the case in a position for viewing the video display;
   d) a power adapter configured such that the notebook computer can receive power from a vehicle DC outlet; and
   e) an audio adapter to transmit an audio signal from the notebook computer to a vehicle audio system.

3. The video system as in claim 2 wherein the plurality of straps are detachable from the bottom part of the case.

4. The video system as in claim 3 wherein a pocket is disposed in the case to contain the detached plurality of straps.

* * * * *